United States Patent
Rhea et al.

(10) Patent No.: US 6,769,671 B2
(45) Date of Patent: Aug. 3, 2004

(54) DEVICE AND METHOD FOR INDICATING THE AMOUNT OF WATER CONTAINED IN A HUMIDIFIER WATER BOTTLE

(75) Inventors: Steven L. Rhea, St. Peters, MO (US); Mark J. Tomasiak, St. Peters, MO (US); Charles F. Wiegand, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/087,554

(22) Filed: Mar. 1, 2002

(65) Prior Publication Data

US 2003/0164561 A1 Sep. 4, 2003

(51) Int. Cl.[7] .................................................. B01F 3/04
(52) U.S. Cl. ...................... 261/72.1; 261/104; 261/107
(58) Field of Search .......................... 261/72.1, 99, 104, 261/107, 119.1

(56) References Cited

U.S. PATENT DOCUMENTS

| | | |
|---|---|---|
| 2,402,707 A | 6/1946 | Stepan, Jr. et al. |
| 2,561,592 A | 7/1951 | Palmer |
| 2,670,941 A | 3/1954 | Feinberg |
| 3,127,065 A | 3/1964 | Stevenson |
| 3,900,134 A | 8/1975 | Larson |
| 5,037,583 A | 8/1991 | Hand |
| 5,092,693 A | 3/1992 | Uchimura |
| 5,110,511 A | 5/1992 | Hand |
| 5,397,510 A * | 3/1995 | Clark ........................... 261/26 |
| 5,447,663 A * | 9/1995 | Dix et al. ...................... 261/70 |
| 5,529,726 A | 6/1996 | Glenn |
| 5,682,932 A * | 11/1997 | Ediger ......................... 141/366 |
| 5,688,446 A | 11/1997 | Glenn |
| 5,810,247 A | 9/1998 | Petroff |
| 6,149,069 A | 11/2000 | Stanek et al. |
| 6,168,139 B1 * | 1/2001 | Kennedy et al. .............. 261/26 |
| 6,176,473 B1 | 1/2001 | Stanek et al. |
| 6,554,381 B2 * | 4/2003 | Locher et al. .................. 347/7 |

* cited by examiner

*Primary Examiner*—Scott Bushey
(74) *Attorney, Agent, or Firm*—Howrey Simon Arnold & White LLP

(57) ABSTRACT

A humidifier includes a reservoir for containing water, a wick wettable by water contained in the reservoir and a humidifier bottle for supplying water to the reservoir. The bottle is pivotally situated in the humidifier and a translating member is responsive to the angular movement of the humidifier bottle. The translating member includes a visual indicator thereon to indicate the amount of water contained in the bottle. A biasing member cooperates with the translating member to situate the humidifier bottle in a first angular position in response to the bottle being empty, such that the bottle is displaced from the first angular position within the receptacle when the bottle contains water. The amount of angular displacement of the bottle is a function of the amount of water in the bottle. A light source may be provided to illuminate the display window in response to movement of the translating member.

15 Claims, 5 Drawing Sheets

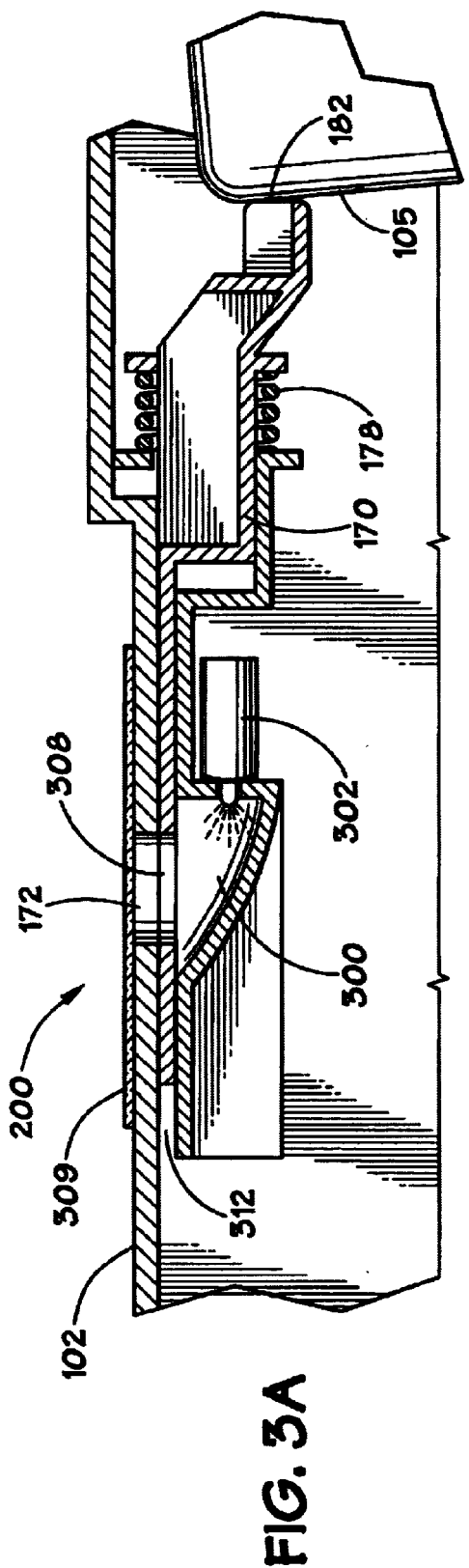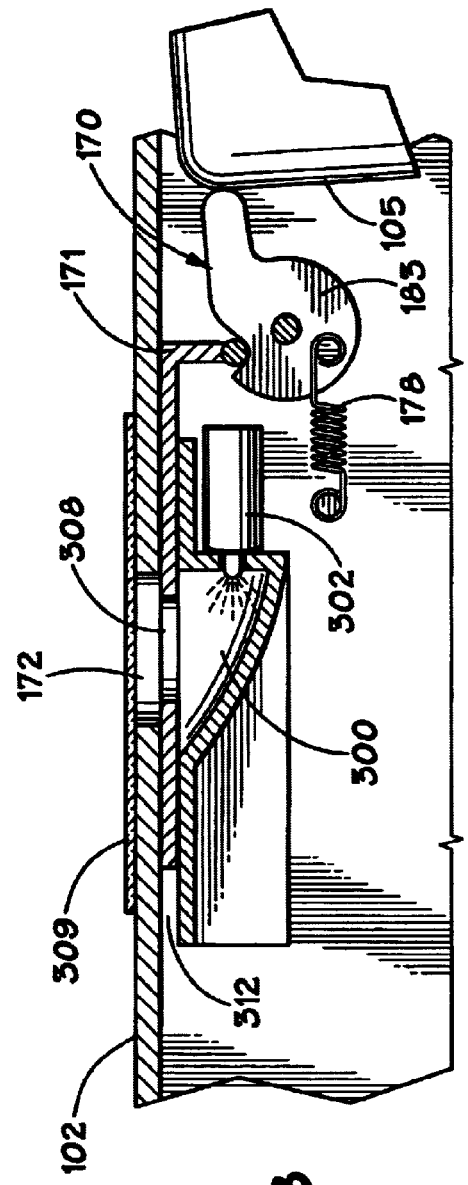

DEVICE AND METHOD FOR INDICATING THE AMOUNT OF WATER CONTAINED IN A HUMIDIFIER WATER BOTTLE

BACKGROUND OF THE INVENTION

1. Field of the Invention

The present invention relates generally to humidifiers, and, more particularly, to a capacity indicator for indicating the amount of fluid contained in a humidifier bottle.

2. Description of Related Art

Humidifiers are commonly used in homes to add moisture to the air, particularly during the winter months, when the air typically has low moisture content. The added moisture content in the air during these dry, cold weather months provides for a more comfortable environment within the home. As a result, humidifiers have become a popular, inexpensive means for achieving optimal air moisture content within the home environment.

One difficulty commonly encountered with humidifiers, however, is the inability to determine the water level of a humidifier bottle with relative ease. Some humidifiers have an elongated clear plastic strip (i.e., a window) on their side such that one can view the bottle compartment of the humidifier. Typically, an individual will rely on direct visual sighting of the bottle's water level through this clear plastic strip to determine the amount of water contained therein. Since many humidifiers are compact in size and are placed on the floor, such viewing of the water level typically requires one to bend down to view the plastic strip of the humidifier. Viewing the water level within close proximity to the humidifier is generally needed since water is colorless, and it is often difficult to ascertain such water level at a distance. Thus, the action of bending down to the humidifier can be inconvenient.

Previous methods may also require that the user open the unit, lift up the bottle, and estimate how much water remains in the bottle. If the unit has more than one bottle, this procedure would have to be repeated for the other bottle.

Furthermore, users of humidifiers want an easy way to identify how full the humidifier is and not just when the bottle is empty. As well users desire a way of visualizing the amount of water in each of the bottles, without having to physically interface with the unit at all. Use of an illuminated capacity indicator could provide indication of the amount of water in the bottle of a humidifier from a substantial distance or even within a dark room.

The present invention is directed to overcoming, or at least reducing the effects of, one or more of the problems set forth above.

SUMMARY OF THE INVENTION

In one aspect of the present invention, a humidifier includes a reservoir for containing water, a wick wettable by water contained in the reservoir and a humidifier bottle for supplying water to the reservoir. The bottle is pivotally situated in the humidifier and a translating member is responsive to the angular movement of the humidifier bottle. The translating member includes a visual indicator thereon to indicate the amount of water contained in the bottle. A biasing member cooperates with the translating member to situate the humidifier bottle in a first angular position in response to the bottle being empty, such that the bottle is displaced from the first angular position within the receptacle when the bottle contains water. The translating member may, for example, be situated to move laterally and/or rotationally in response to the pivotal movement of the bottle. The amount of angular displacement of the bottle is a function of the amount of water in the bottle.

The humidifier may include a display opening or window in the humidifier's cabinet such that the visual indicator of the translating member is visible therethrough. In certain exemplary embodiments, a light source is provided to illuminate portions of the display window in response to the movement of the translating member.

BRIEF DESCRIPTION OF THE DRAWINGS

Other objects and advantages of the invention will become apparent upon reading the following detailed description and upon reference to the drawings in which:

FIGS. 3A and 3B are cross section views of illuminated water level indicators having translating members mounted for lateral and rotational movement, respectively, in accordance with exemplary embodiments of the present invention;

Figure 1:
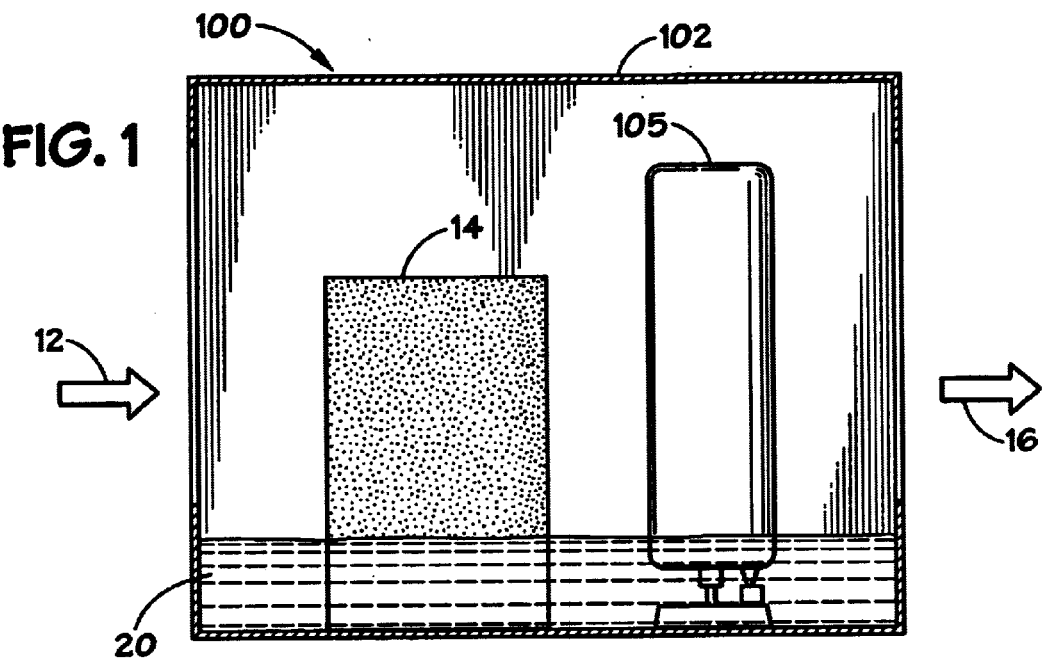
FIG. 1 is a block diagram conceptually illustrating operation of a humidifier.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates the operating principle of a humidifier 100 in accordance with the invention. The various components of the humidifier 100 are situated in a cabinet 102. A stream of dry air 12 enters the humidifier 100 through an intake and passes through or over a wet wick 14 and picks up additional moisture to form a humid stream of air 16. The humid stream of air 16 leaves the humidifier by an output.

One end of the wick 14 makes contact with water in a reservoir 20. Water from the reservoir 20 replenishes water carried away from the wick 14 by the stream of air 16. At least one humidifier bottle 105 is situated within a humidifier bottle receptacle 110 so as to supply water to the reservoir 20. The humidifier bottle receptacle 110 includes a mounting seat 120, which extends from the bottom of the humidifier 100, and provides vertical support to the humidifier bottle 105 via a pivot point 125 about which the humidifier bottle 105 may pivot.

Figure 2:
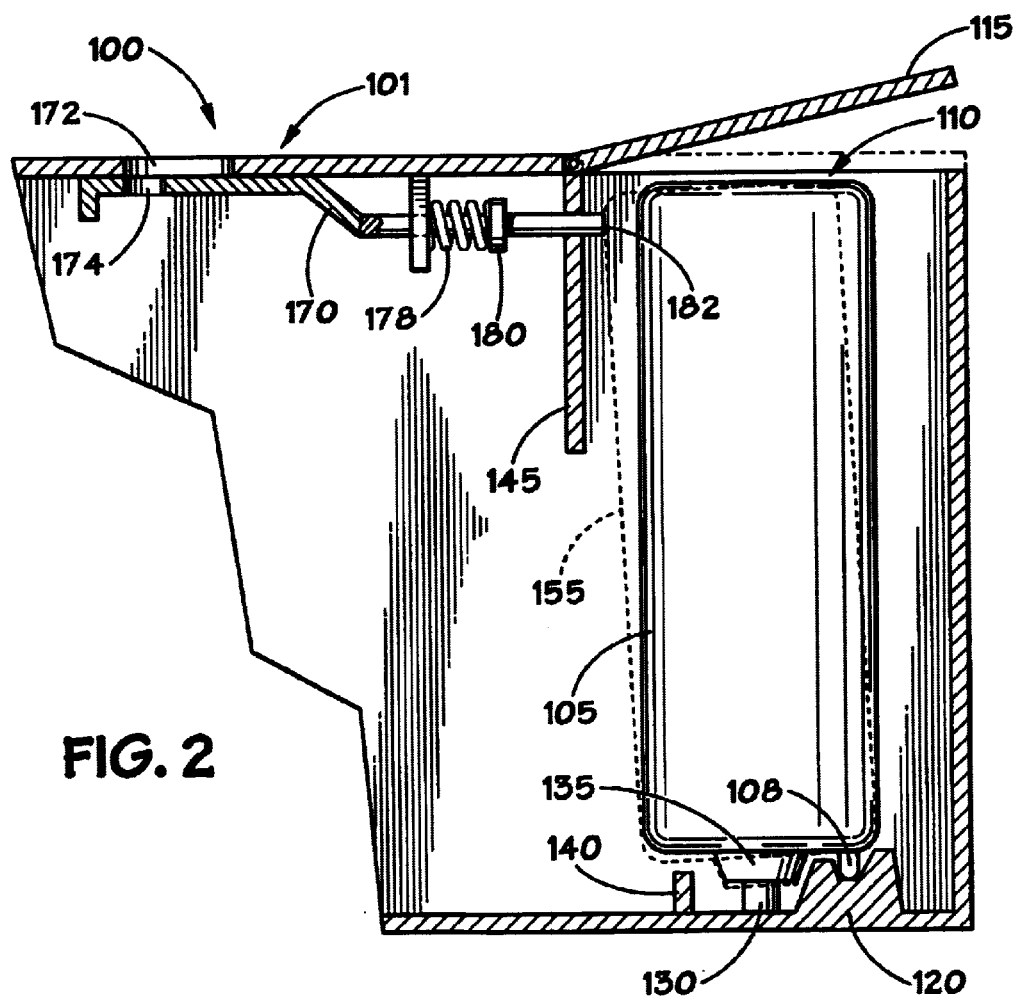
FIG. 2 is a cross section view schematically illustrating portions of a humidifier in accordance with exemplary embodiments of the present invention.

In FIG. 2, a cross-sectional view of a portion of a humidifier 100 having a humidifier bottle 105 disposed within a humidifier bottle receptacle 110 is shown in accordance with an exemplary embodiment of the invention. The embodiment shown in FIG. 2 includes a water level indicator generally indicated by reference 101. Access to the humidifier bottle receptacle 110 shown in FIG. 2 is achieved via a hinged flap 115 on the top surface of the humidifier 100.

A mounting seat 120 extends from the bottom of the humidifier 100 and receives a pivot point or tab 108 extending from the bottom the bottle about which the bottle 105 pivots. In other embodiments, the mounting seat 120 has an extension about which the bottle 105 pivots. The mounting seat 120 further includes a water dispensing actuator 130 for actuating a dispensing cap 135 on the bottom of the humidifier bottle 105. The dispensing cap 135 discharges water from the humidifier bottle 105 when actuated by the dispensing actuator 130.

The tab 108 of the bottle 105 is situated in the mounting seat 120 such that the humidifier bottle 105 is able to tilt towards a sidewall 145 of the humidifier bottle receptacle 110 as the bottle 105 pivots about the tab 108. When tipped toward the sidewall 145, the bottle 105 can rest against a support 140. Alternatively, the humidifier bottle 105 could rest against the sidewall 145 when in a tipped position, eliminating the need for the support 140.

The humidifier 100 further includes a translating member 170. The translating member 170 comprises a moveable actuator rod or plate that is supported adjacent to a surface of the humidifier cabinet 102. The particular translating member 170 shown in FIG. 2 translates the pivoting movement of the bottle 105 to linear movement, and thus is situated to move laterally in response to the pivotal movement of the bottle 105. In other exemplary embodiments, the translating member is rotatable, such that it translates the pivotal movement of the bottle 105 to rotational movement.

The cabinet 102 includes a display window or opening 172. In the particular embodiment illustrated in FIG. 2, the humidifier bottle 105 will tend to tip towards the sidewall 145 absent any biasing force. A biasing member, such as a spring 178, is mounted on the translating member 170 and is arranged to push against a stop 180 affixed to the translating member 170. The biasing member 178 is specifically calibrated to position a visual indicator 174 of the translating member 170 within the display opening 172 such that the visual indicator 174 is visible through the display opening 172.

A contact end 182 of the translating member 170 projects through an opening in the sidewall 145 and contacts the humidifier bottle 105. The translating member 170 with the biasing member 178 provides a horizontal resistance against the humidifier bottle 105 when leaning towards the sidewall 145. In particular, the biasing member 178 is adapted such that it situates the humidifier bottle 105 in various angular positions in response to the amount of water contained in the humidifier bottle 105. In the illustrated embodiment, the biasing member 178 and translating member 170 operate to position the bottle 105 in a generally vertical position when the bottle 105 is empty (the position shown with solid lines), and when the bottle contains water, it pushes against the translating member 170 and spring 178 to move the translating member 170 to the left as illustrated in FIG. 2 (such as position 155 shown in broken lines).

The visual indicator 174 of the translating member 170 is situated such that it lies adjacent the display window 172, such that the position of the visual indicator 174 can be viewed through the display window 172. In this manner, the position of the bottle 105 is displayed, thus providing an indication of the amount of water contained in the bottle as a function of the position of the bottle. The display window 172 may simply be an opening through the humidifier cabinet 102, or it could be a portion of clear or frosted plastic forming a window in the cabinet 102. It may further include a lens with which to magnify and focus the contrast of the visual indicator 174. Still further, in exemplary embodiments of the invention, a graphic is provided in conjunction with the display window 172—for example, "F" for full and "E" for empty.

The translating member 170 may also be used in conjunction with a microswitch (not shown in FIG. 2) to turn the unit off or on according to the position of the rotating humidifier bottle. It is important to have the correct spring tension on the biasing member 178 as this dictates the accuracy of the display and how closely the bottles will be empty when the unit is shut off.

With the bottle filled to capacity, the humidifier bottle 105 applies a maximum pressure to the biasing member 178. The position 155 shown with a dashed line indicates the tilt of the humidifier bottle 105 displaced from the original vertical position. The contact end 182 of the translating member 170 maintains contact with the bottle. As a result, the translating member 170 is forced to the leftmost position as depicted in FIG. 2. The visual indicator 174 aligns with a far end of the display window 172 (the leftmost position as shown in FIG. 2). The alignment corresponds properly to the condition of the humidifier bottle 155 filled to its capacity.

As the humidifier bottle 105 drains of water through the dispensing cap 135, the bottle becomes lighter and consequently begins to apply less pressure to the biasing member 178. As the bottle empties, the biasing member 178 provides sufficient counter-force to the bottle and causes the bottle to change its angular displacement within the humidifier bottle receptacle 110. The contact end 182 maintains its contact with the bottle, and the translating member 170 moves laterally with the displacement of the bottle 105. The visual indicator 174 also moves with the translating member 170 and aligns with different portions of the display window 172. The displacement and counter-force continues as the water in the bottle 105 depletes. Finally, the bottle 105 is emptied and attains the vertical position, and the visual indicator 174 is situated in the rightmost portion of the display window 172 (as illustrated in FIG. 2).

The angular displacement (i.e., the tilt) of the humidifier bottle is directly proportional to the amount of water contained therein. Accordingly, the amount of water remaining within the bottle 105 can be indicated according to its angular displacement within the receptacle 110 and the amount of force exerted by the humidifier bottle against the biasing member 178.

FIG. 3A illustrates an exemplary embodiment of an illuminated capacity indicator 200 for a humidifier bottle according to the present invention. The illuminated capacity indicator 200 functions in a manner similar to the indicator described in conjunction with FIG. 2. An enclosure or light chamber 300 is situated below the display window 172. A light source 302 floods the enclosure 300 with light. Determination of the best type of light source (i.e. incandescent, neon, LED) depends on a number of variables such as the dimensions of the enclosure and the amount of desired visibility. In a preferred embodiment, a red colored LED is used to give a "high tech" look, and the LED generally has a longer life than other types of light.

The translating member 170 passes through an opening 312 within the enclosure 300. The translating member 170 generally functions in the manner described and illustrated in conjunction with FIG. 2. The visual indicator of the translating member 170 is a light emitting opening or window 308 therein, which may be fashioned of a transparent or semitransparent material, or simply an opening in the translating member 170.

The light emitting opening 308 of the translating member 170 is situated adjacent the display window 172. When the humidifier bottle 105 is full of water, the humidifier bottle 105 pushes against the spring 178 and moves the translating member 170 to the left as illustrated in FIG. 2A, and the light emitting opening 308 fully aligns with the display window 172 so that the entire display window 172 is illuminated to provide an indication of a full bottle. A display graphic 309 (i.e., "F" for fill and "E" for empty) may further be provided.

As the humidifier bottle 105 drains of water, the translating member 170 moves to the right, as viewed in FIG. 3A, as the spring 178 pushes the contact end 182 of the translating member 170 against the humidifier bottle 105. As the position of the translating member 170 changes, less of the light emitting opening 308 aligns with the display window 172, such that only a portion of the window 172 is illuminated. As the bottle 105 empties, less and less of the window 172 is illuminated, indicating the relative amount of water contained in the bottle 105.

In FIG. 3A, the translating member 170 moves laterally in response to the pivotal movement of the bottle 105. Another embodiment is shown in FIG. 3B, in which the translating member 170 includes a contact portion 183 that is rotatably mounted, such that the contact portion translates the pivotal movement of the bottle 105 to rotational movement. The contact portion 183 moves a display portion 171 laterally to position the light emitting opening 308 relative to the display window 172 to indicate the amount of water contained in the bottle 105.

Figure 4A:
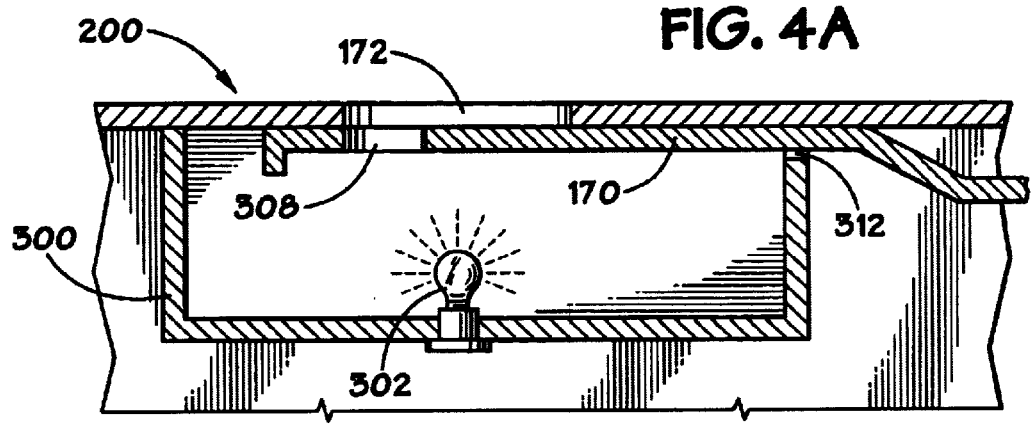
FIGS. 4A–4C are cross section side, top and front views, respectively, schematically illustrating an illuminated water level indicator in accordance with another exemplary embodiment of the present invention.
Figure 4B:
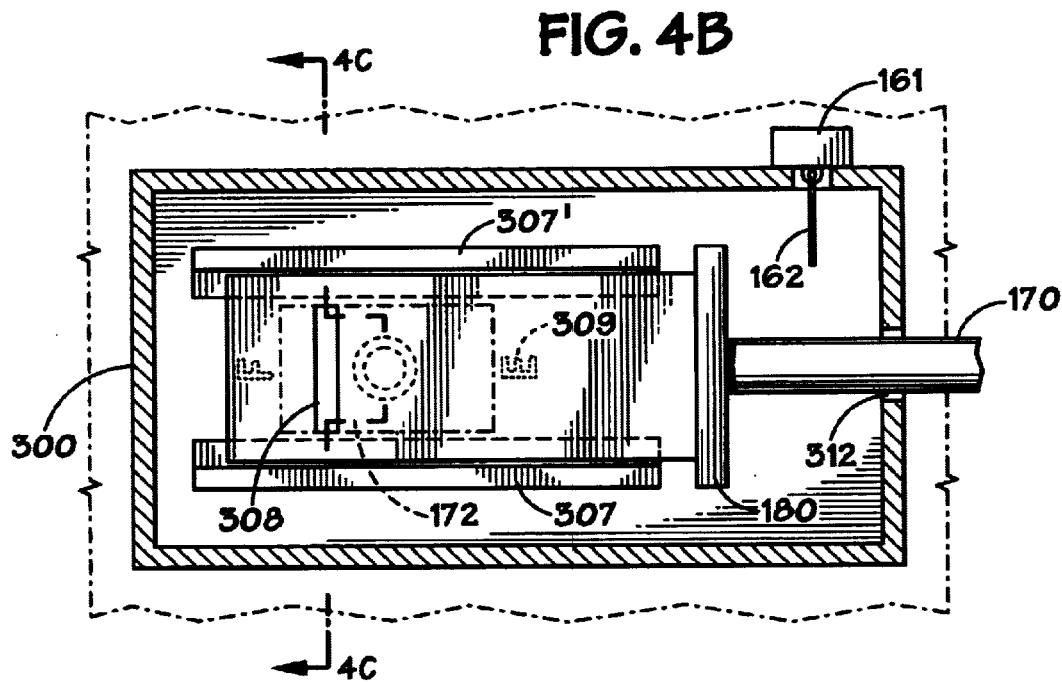
Figure 4C:
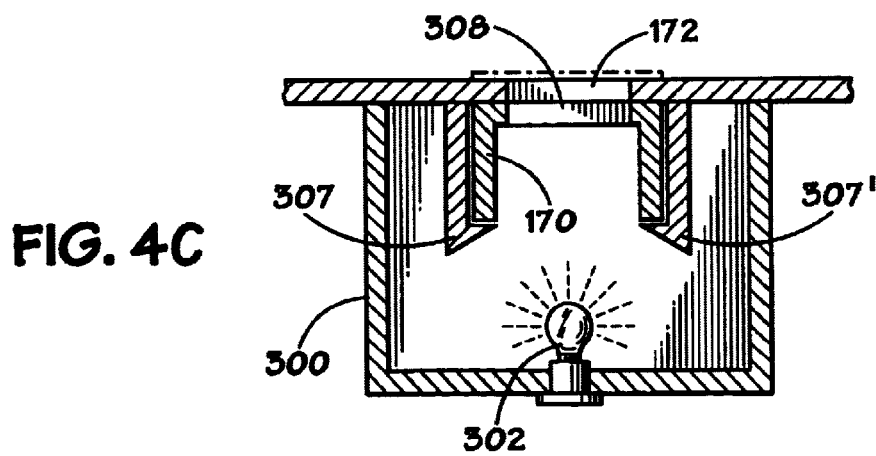
Figure 5:
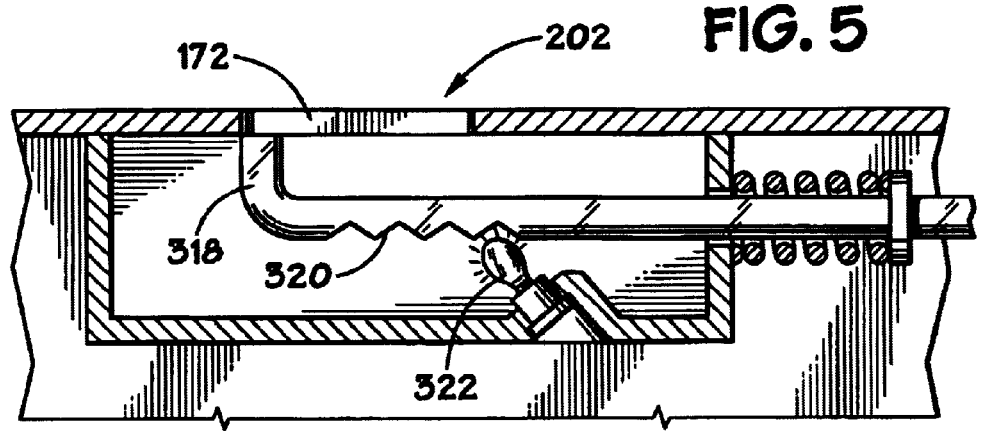
FIGS. 5–9 conceptually illustrate exemplary illuminated water level indicators in accordance with various alternative embodiments of the present invention.

An alternative illuminated indicator 201 in accordance another exemplary embodiment is shown in FIGS. 4A-4C. As with the indicator 200 shown in FIGS. 3A and 3B, an enclosure or light chamber 300 is situated below the display window 172 and a light source 302 floods the enclosure 300 with light. The translating member 170 includes a light emitting opening 308 therein. Light from the light source 302 within the enclosure 300 escapes through the light emitting opening 308 of the translating member 170 in a controlled manner to illuminate an appropriate portion of the display window 172. Again, the translating member 170 functions in the manner described and illustrated in conjunction with FIG. 2.

The translating member 170 is held adjacent to the top surface of the humidifier cabinet 102 by retainers 307 and 307' on both sides of the thereof, shown in FIGS. 4B and 4C. Light from the light source 302 escapes through the light emitting opening 308 and illuminates a portion of the display window 172. The translating member 170 is movable within the retainers 307 and 307', which act as a channel. In certain embodiments, the translating member 170 may also be used in conjunction with a micro-switch 161 to turn the humidifier off or on according to the position of the rotating humidifier bottle. For example, the translating member 170 may contact an actuator 162 of the switch 161.

When the humidifier bottle 105 is full of water, the humidifier bottle 105 overcomes the force of the spring 178 and moves the translating member 170 deeper within the retainers 307 and 307' (to the left as shown in FIGS. 4A and 4B. The light emitting opening 308 aligns with a far end of the display window 172, with includes a display graphic 309 to indicate that the humidifier bottle is filled to its capacity (i.e. "F" for full).

As the humidifier bottle 105 drains of water, the translating member 170 moves laterally. As the position of the translating member 170 changes, the position at which the light exits the enclosure 300 through the light emitting opening 308 also moves relative to the display window 172 and associated graphic indicators 309. Finally, when the bottle is depleted of fluid, the light emitting opening 308 lies at the other end of the display window 172 (i.e. "E" for empty).

FIGS. 5–9 conceptually depict additional exemplary embodiments of illuminated water bottle capacity indicators according to the present invention. The indicator 202 depicted in FIG. 5 has a light-bearing conduit or clear rod 318. The rod 318 acts as the translating member, transferring the motion of the bottle 105 to the display window 172, but also acts as a light-bearing conduit for light. The top of the humidifier cabinet 102 includes the display window 172, which may have different colors to provide contrast to the light passing through the display window 172. A light source 322 is situated adjacent the rod 318. The rod 318 has a focusing area or a series of notches 320. The notches 320 allow the light from the source 322 to enter the rod 318. The light is conducted to the display window 172 where it illuminates a portion of the display window 324 outside the humidifier.

Figure 6:
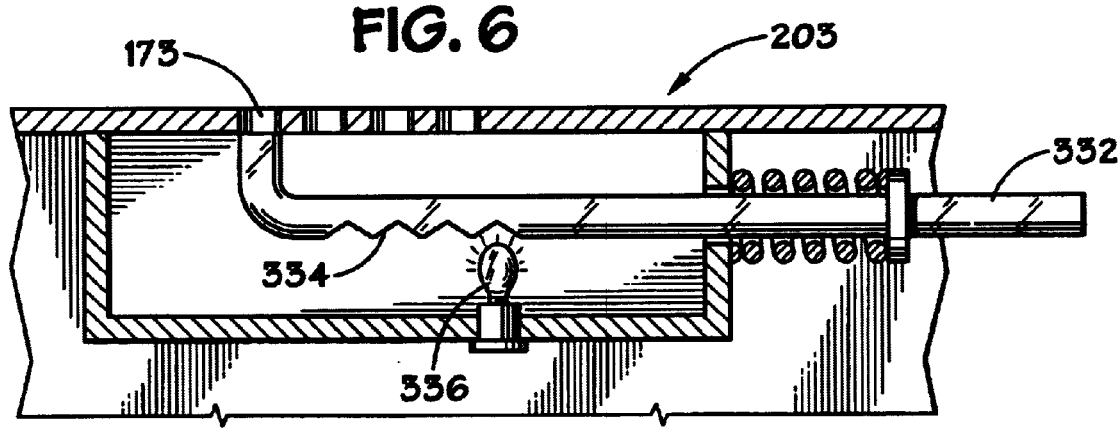

In the indicator 203 shown in FIG. 6, the top of the humidifier 100 includes a series of display slots 173. The slots 173 may offer different colors to provide contrast to the light passing through them. Relative to the display slots 173 is a light bearing conduit or a rod 332. The rod 332 may be fabricated from a clear plastic material, including a focusing area or a textured portion 334. The textured portion 334 allows light from a light source 336 to enter the rod 332.

Figure 7:
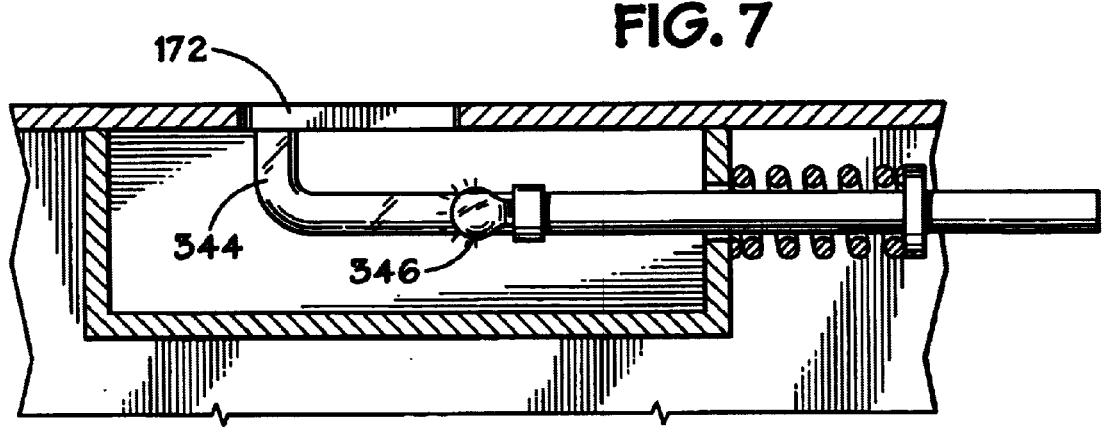

The light is conducted to one of the display slots 173 where the end of the rod 332 is aligned. Light from the end of the rod 332 illuminates one of the display slots 173 so that the light is visible from outside the humidifier to indicate the position of the bottle 105, and thus, the amount of water contained in the bottle 105. FIG. 7 depicts another embodiment in accordance with the present invention, in which a light source 346 is situated in a light bearing conduit or a light tube 344. The light 346 moves with the tube 344 to maintain a constant light intensity.

Figure 8:
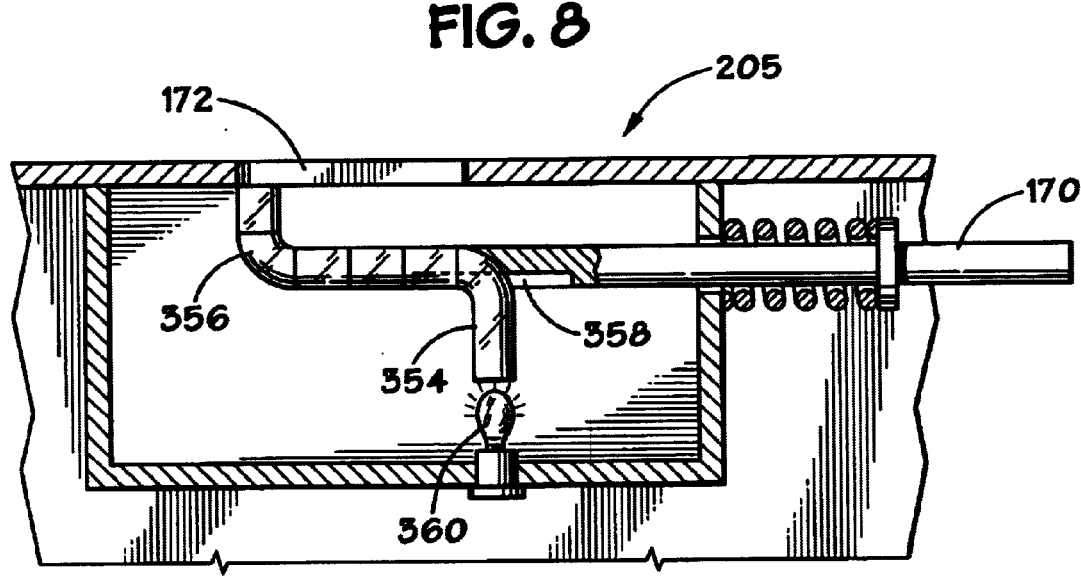
Figure 9:
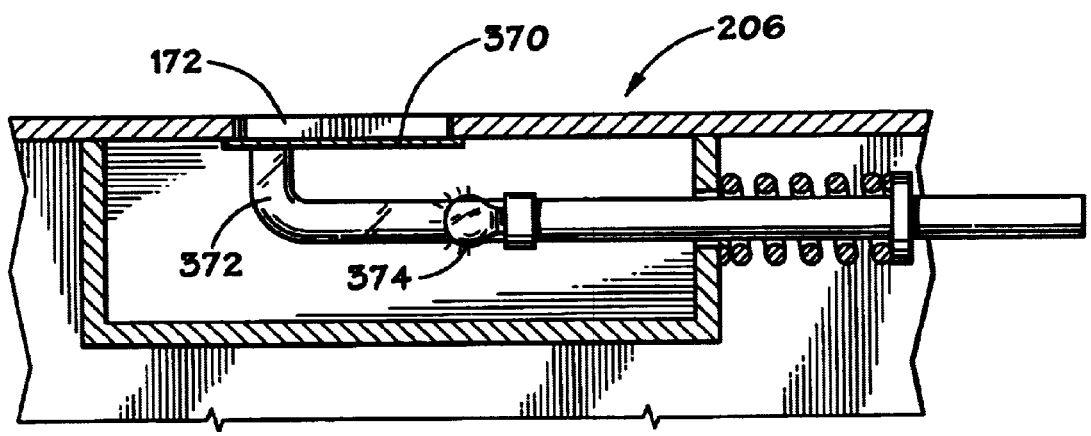

In the exemplary indicator 205 shown in FIG. 8, a light bearing conduit or a rod 354 is formed by a series of connected segments of light pipe 356 and extends from an opening 358 in the translating member 170. The flexible tubing of light pipe segments 356 bends towards the display window 172 and a light source 360 to allow the light from the source 360 to illuminate a portion of the display window 172 outside the humidifier. In this manner, the light source 360 stays stationary, while the rod 354 is movable. FIG. 9 depicts yet another indicator 206 in which the display window 172 has a colored film 370. The film 370 may have more than one color section to provide contrast to light passing through different sections of the film 370. A light source 374 is situated on a light bearing conduit or a clear optic rod 372. This configuration allows for different shapes of display as well as different colors of light. The light 374 moves with the rod 372 to maintain a constant light intensity.

The particular embodiments disclosed above are illustrative only, as the invention may be modified and practiced in different but equivalent manners apparent to those skilled in the art having the benefit of the teachings herein. For example, it would be a routine undertaking for one skilled in the art having the benefit of this disclosure to modify the position of the light source from that shown and described herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A humidifier, comprising:
    a cabinet having a display window therein:
        a reservoir situated in the cabinet for containing water;
        a wick wettable by water contained in the reservoir;
        a humidifier bottle for supplying water to the reservoir and pivotally situated in a humidifier bottle receptacle;
        a translating member responsive to the angular movement of the humidifier bottle, the translating member including a visual indicator generally adjacent the display window that moves with the translating member to indicate the amount of water contained in the humidifier bottle; and
        a biasing member cooperating with the translating member to situate the humidifier bottle in a first angular position in response to the bottle being empty, such that the bottle is displaced from the first angular position within the receptacle when the bottle contains water, wherein the amount of angular displacement of the bottle is a function of the amount of water in the bottle.

2. The humidifier of claim 1, further comprising a light source situated adjacent the translating member.

3. The humidifier of claim 2, wherein the visual indicator includes a light emitting opening.

4. The humidifier of claim 1, wherein the translating member is mounted for lateral movement in response to pivotal movement of the bottle.

5. The humidifier of claim 1, wherein the translating member is mounted for rotational movement in response to pivotal movement of the bottle.

6. The humidifier of claim 2, further comprising an enclosure, wherein the light source is situated to flood the enclosure with light, and wherein the translating member is movably received in the enclosure.

7. The humidifier of claim 2, wherein the translating member comprises a light bearing conduit having one end adjacent the display window, wherein the light from the light source travels through the light bearing conduit and illuminates portions of the display window.

8. The humidifier of claim 2, wherein the translating member includes a notched portion for receiving light from the light source.

9. The humidifier of claim 2, wherein the light source is attached to the translating member and movable therewith.

10. The humidifier of claim 1, wherein the bottle includes a tab extending therefrom, such that the bottle is pivotable about the tab.

11. The humidifier of claim 1, further comprising a graphic indicator situated adjacent the display window.

12. The humidifier of claim 1, wherein the display window includes a plurality of slots.

13. The humidifier of claim 1, wherein the display window includes a colored film.

14. A humidifier, comprising:
    a reservoir for containing water;
    a wick wettable by water contained in the reservoir;
    a humidifier bottle for supplying water to the reservoir and pivotally situated in a humidifier bottle receptacle; and
    first means for indicating the amount of water contained in the bottle;
    second means cooperating with the first means for situating the humidifier bottle in a first angular position in response to the bottle being empty, such that the bottle is displaced from the first angular position within the receptacle when the bottle contains water, wherein the amount of angular displacement of the bottle is a function of the amount of water in the bottle.

15. The humidifier of claim 14, further comprising third means for illuminating the first means.

* * * * *